United States Patent
Bilsens et al.

[11] 3,971,999
[45] July 27, 1976

[54] COHERENT PHASE DEMODULATOR FOR PHASE SHIFT KEYED SUPPRESSED CARRIER SIGNALS

[75] Inventors: Gunars Bilsens; Raymond Oscar Figueroa, both of Scottsdale, Ariz.

[73] Assignee: Motorola, Inc., Chicago, Ill.

[22] Filed: June 23, 1975

[21] Appl. No.: 589,273

[52] U.S. Cl. ............................. 329/105; 325/329; 325/349; 329/112; 329/117; 329/122; 329/170
[51] Int. Cl.² .......................................... H03D 3/00
[58] Field of Search .......... 329/103, 105, 112, 117, 329/122, 168, 170; 325/45, 49, 329, 344, 349

[56] References Cited
UNITED STATES PATENTS 3,906,380   9/1975   Querry et al ........................ 329/122

*Primary Examiner*—Siegfried H. Grimm
*Attorney, Agent, or Firm*—Sang Ki Lee; Harry M. Weiss

[57] ABSTRACT

Digital data, differentially phase shift keyed on a suppressed carrier, double side band transmission, is recovered by multiplying the input signal by a signal derived from regenerative feedback and consisting of the sum of a phase-coherent carrier and the recovered data signal. The phase-coherent carrier is derived by alternate phase reversals of the incoming carrier, produced by the polarity changes in the data. The phase-coherent carrier and the recovered data signal are components of the multiplier output and are separated by bandpass and low pass filters respectively, the output terminal of the low pass filter also being the data output terminal. When a carrier has been phase modulated with two distinct signals in quadrature, the received carrier is phase shifted to produce two signals in quadrature, then each of the resultant modulated carriers is demodulated as with the single signal carrier, using one common bandpass filter.

2 Claims, 3 Drawing Figures

3,971,999

COHERENT PHASE DEMODULATOR FOR PHASE SHIFT KEYED SUPPRESSED CARRIER SIGNALS

BACKGROUND OF THE INVENTION

This invention relates to transmission and reception of digital data and more particularly to optimal decoding of digital signals, phase-modulated individually or in quadrature on suppressed carrier signals.

Suppressed carrier transmission is widely used because of the basic fact that no power is wasted in transmitting the carrier since only side bands are transmitted. At the receiver, therefore, the carrier frequency must be restored which has been done by squaring the transmitted signal (after heterodyning) which produces a double frequency term. This squared signal is fed through a bandpass filter or a phase locked loop, then divided down to the proper frequency. This term is then multiplied by the input signal (after heterodyning, before squaring) to produce a signal from which the data can be retrieved.

In the case of quadrature modulation, this complete demoduation sequence is applied to the demodulation separately for each of the modulating signals.

SUMMARY OF THE INVENTION

The object of this invention is to provide information retrieval from a suppressed carrier phase-modulated transmission of two data signals in quadrature, with a minimum number of circuit components.

In the circuit according to the invention, the received and heterodyned signal is phase-shifted for separation of the two quadrature signals. Each signal is then demodulated as follows: the received (or heterodyned) signal is multiplied by a regenerative feedback signal to produce an output which includes a phase-coherent carrier and a recovered data signal. The components, since they have nonoverlapping spectra are separated by means of a bandpass filter and a low pass filter, the output terminal of the low pass filter being also the data output terminal. The phase-coherent carrier and the recovered data signal are added algebraically to produce the feedback signal for the multiplier. Each of the filter loops has a gain of one and a net phase shift of zero.

The two quadrature signals use a common bandpass filter. Thus, if one signal should be lost completely for a perceptible interval, the phase relationship of that carrier would not be lost, but would be sustained by the other carrier, through the common bandpass filter.

DESCRIPTION OF THE PREFERRED EMBODIMENTS

Figure 2:
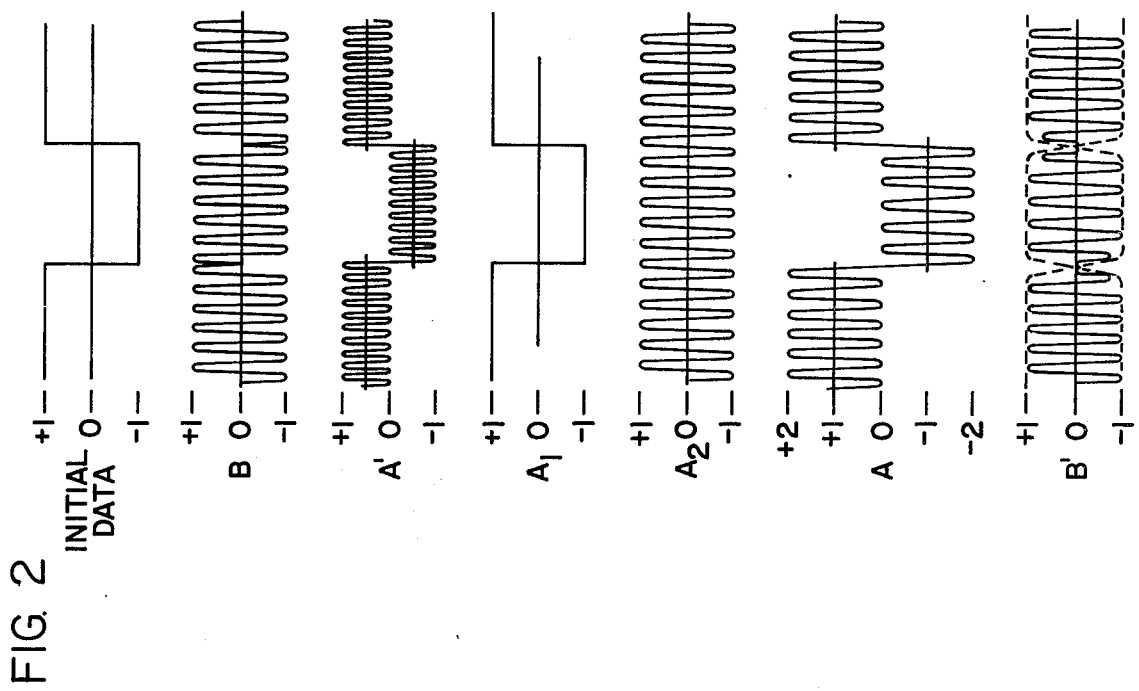
FIG. 2 is a chart of the pertinent waveforms of the circuit of FIG. 1.
Figure 1:
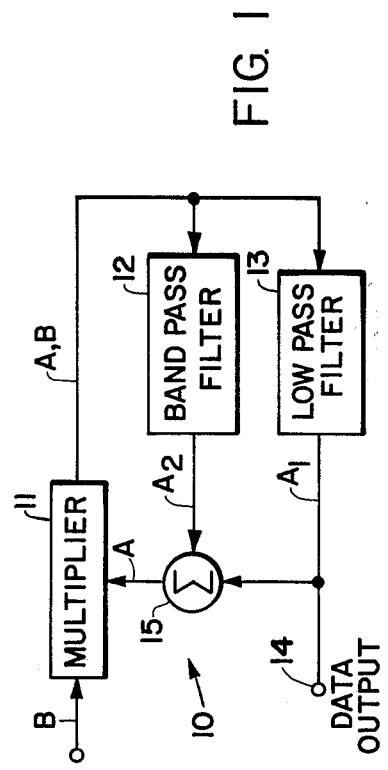
FIG. 1 is a block diagram of the basic bi-phase circuit according to the invention.

FIG. 1 shows the basic circuit, designated generally as reference number 10, which will be best understood in relation to FIG. 2 which shows the pertinent waveforms. Initial data in digital form (FIG. 2) is phase modulated or phase shift keyed on a carrier frequency. The carrier is then suppressed and the transmitted and received signal is of the form B. In the preferred embodiment, initial data is differentially encoded to remove phase ambiguity. Also in the preferred embodiment the input signals are heterodyned before demodulation, but this is not required within the spirit and scope of the invention. With heterodyning the demodulated input signal would still be of the form B, i.e., a carrier aperiodically shifted 180° in phase in accordance with the data to be transmitted. The signal B is connected to one input of a multiplier 11 wherein it is multiplied by a feedback signal A which will be described later. The output of the multiplier 11 is connected to both a bandpass filter 12 and a low pass filter 13. The multiplier output contains the received data signal, the received (or heterodyned) carrier and a double carrier frequency component. The output of the bandpass filter 12 is the coherent phase carrier frequency $A_2$. The output of the low pass filter 13 is the recovered data signal $A_1$. The double frequency term is no longer present. The signal $A_1$ is also available at a data output terminal 14. Signals $A_1$ and $A_2$ are added in an adder 15 to form signal A which is the feedback signal provided to the second input terminal of the multiplier 11. Waveform B of FIG. 2 is a somewhat idealized rendition of the received signal, due to bandwidth limitations in the transmission system, waveform B' being closer to the actual case. This limiting, however, does not cause a problem since the characteristics of the carrier loop (containing multiplier 11, filter 12 and adder 15) are such as to provide signal $A_2$ at a constant amplitude.

To establish a mathematical basis for the operation of the circuit described above, a reference voltage A is assumed to exist at the second input of the multiplier. This voltage must contain the proper elements for self-regeneration, that is, the data and a reference carrier without phase modulation must be included.

Assume a general formula in which $$A = P + k \cos \theta t$$

where $k$ is an arbitrary amplitude value for the carrier content fed back to the multiplier.

$E_{in}$ = input signal = $Pn \cos \theta t$
$P$ = data signal = $\pm 1$
$\theta$ = angular velocity of carrier = $2 \pi f_c$
$\mu_1$ = gain of low pass (data) filter
$\mu_2$ = gain of carrier frequency bandpass filter
$\mu_3$ = gain of multiplier in terms of voltage out for voltage applied to control electrodes
$E_{out}$ = output of multiplier = $\mu_3 E_{in} A = \mu_3 (nP \cos \theta t)(P + k \cos \theta t) = \mu_3 n \cos \theta t + \mu_3 nPk/2 + \mu_3 nPk (\cos 2\theta t)/2$
$E_{bp}$ = bandpass filter output = $\mu_3 \mu_2 n \cos \theta t$
$E_{lp}$ = low pass filter output = $\mu_1 \mu_3 n Pk/2$ Note that the double frequency term is not longer present.

Now since $A = E_{bp} + E_{lp}$ $$P + k \cos \theta = \mu 1 \mu_3 nPk/2 + \mu_2 \mu_3 n \cos \theta t$$

In order for the loop to maintain stability, meaning that the signals neither grow nor decay in amplitude, the coefficient of both sides of the above equation must be equal.

$$\mu_1 \mu_3 nk/2 = 1$$

and $\mu_2 \mu_3 n/k = 1$

For stable operation, two conditions must be met. One, the threshold signal level must be $$n = k/\mu_2\mu_3$$

and, secondly, the ratio between bandpass and low pass gains must be $$\mu_2/\mu_1 = k^2/2$$

where $k$ determines the ratio of amplitudes of the carrier and the data content of the signal $E_r$, the signal applied is reference to the multiplier.

Figure 3:
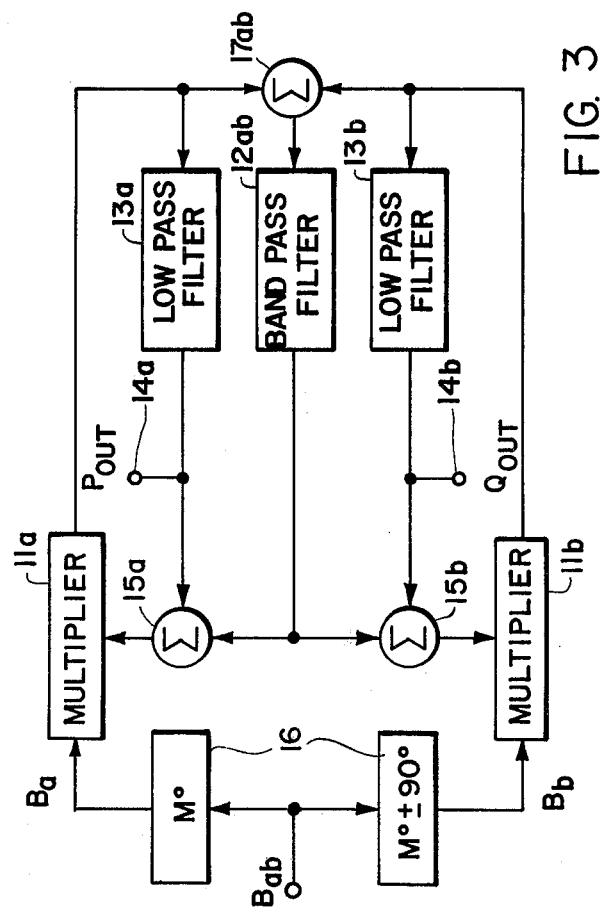
FIG. 3 is a block diagram of the circuit according to the invention as used for four-phase demodulation.

FIG. 3 shows the circuit according to the invention as used with two signals phase modulated on the carrier in quadrature. Each component is demodulated in accordance with the philosophy of the circuit of FIG. 1, but with modifications to adapt it to quadrature modulation. The incoming signal $B_{ab}$ is processed in a phase shifting network 16 which separates the two quadrature components, supplying one quadrature component $B_a$ to a first input terminal of a multiplier 11a and the second quadrature component $B_b$ to a first input terminal of a multiplier 11b. The output of the multiplier 11a is connected to a low pass filter 13a and to an adder 17ab. The output of the low pass filter, which is one of the recovered data signals, is connected to an adder 15a and also to an output terminal 14a. The output of the multiplier 11b is connected to a low pass filter 13b and the adder 17ab. The output of the low pass filter is the other of the two recovered data signals and is connected to an adder 15b and to the second data output terminal 14b. In the adder 17ab the two multiplier outputs are added and connected to a bandpass filter 12ab. The output of the bandpass filter is the coherent phase carrier signal and it is connected to the adder 15a and to the adder 15b. The adder 15a then sums the first recovered data signal and the coherent phase carrier signal to provide the feedback signal for the second input terminal of the multiplier 11a. The adder 15b sums the second recovered data signal and the coherent phase carrier signal to provide the signal which is connected to the second input terminal of the multiplier 11b.

The two quadrature components are thus separately demodulated using a minimum of components; particularly, only a single bandpass filter is required.

What is claimed is:

1. A system for receiving and demodulating a suppressed carrier signal, phase modulated with data signal, comprising:
   means for multiplying the received suppressed carrier signal by a regenerative feedback signal;
   first filter means for recovering a phase-coherent carrier from the output of the multiplier means;
   second filter means for recovering the data signal from the output of the multiplier means;
   added means for combining the recovered phase-coherent carrier and the recovered data signal to produce the regenerative feedback signal; and
   an output terminal for the data signal connected to the output of the second filter means.

2. A method of demodulating a suppressed carrier signal, phase modulated with data signal comprising the steps of:
   multiplying the suppressed carrier signal by a feedback signal;
   separating the products of the multiplication by filtering through a bandpass filter and a low pass filter respectively to produce a phase-coherent carrier and a data signal;
   using the output terminal for the low pass filter as an output terminal for the data signal; and
   adding the phase-coherent carrier to the recovered data signal to produce the feedback signal.

* * * * *